United States Patent [19]

Hansson

[11] Patent Number: 5,273,347
[45] Date of Patent: Dec. 28, 1993

[54] METHOD AND DEVICE IN TRACTOR-TRAILER BRAKES

[75] Inventor: Bill Hansson, Mellerud, Sweden

[73] Assignee: VBG Produkter AB, Vanersborg, Sweden

[21] Appl. No.: 768,948

[22] PCT Filed: Apr. 18, 1990

[86] PCT No.: PCT/SE90/00257

§ 371 Date: Oct. 15, 1991

§ 102(e) Date: Oct. 15, 1991

[87] PCT Pub. No.: WO90/12712

PCT Pub. Date: Nov. 1, 1990

[30] Foreign Application Priority Data

Apr. 21, 1989 [SE] Sweden .................. 8901451

[51] Int. Cl.⁵ .................. B60T 8/36; B60T 8/74
[52] U.S. Cl. .................. 393/7; 303/24.1; 303/DIG. 4
[58] Field of Search .................. 188/112 A, 112 R; 303/7, 9.62, 9.67, 24.1, 113 AP, DIG. 3, DIG. 4, 97, 99

[56] References Cited

U.S. PATENT DOCUMENTS

| | | | |
|---|---|---|---|
| 3,771,840 | 11/1973 | Hubbard | 303/7 X |
| 3,897,979 | 8/1975 | Vangalis et al. | 303/7 X |
| 3,908,782 | 9/1975 | Lang et al. | 303/7 X |
| 3,953,084 | 4/1976 | Pittet, Jr. et al. | 118/112 R X |
| 4,708,225 | 11/1987 | Feldman et al. | 303/DIG. 4 X |
| 4,726,627 | 2/1988 | Frait et al. | 303/24.1 |
| 4,768,840 | 9/1988 | Sullivan et al. | 303/24.1 X |
| 4,804,237 | 2/1989 | Gee et al. | 303/7 |
| 4,818,035 | 4/1989 | McNinch, Jr. | 188/112 R X |
| 4,984,852 | 1/1991 | McNinch, Jr. | 188/112 R X |
| 5,029,947 | 7/1991 | Knight et al. | 188/112 R X |
| 5,050,938 | 9/1991 | Brearley et al. | 303/7 |
| 5,080,445 | 1/1992 | Brearley et al. | 303/7 |

FOREIGN PATENT DOCUMENTS

| | | | |
|---|---|---|---|
| 276435 | 8/1988 | European Pat. Off. | 303/DIG. 4 X |
| 8743 | 1/1981 | Japan | 303/DIG. 4 X |
| 1046143 | 10/1983 | U.S.S.R. | 303/DIG. 4 X |

Primary Examiner—Robert J. Oberleitner
Assistant Examiner—Alfred Muratori
Attorney, Agent, or Firm—Gunn, Lee & Miller

[57] ABSTRACT

The invention relates to a method and a device for controlling the operating brake pressure to pressure medium brakes in a vehicle combination comprising a tractor vehicle and at least one trailer vehicle. The vehicles in this case are connected by a conventional coupling device that includes standard brakeline connections. Forces developing in the coupling device are measured during the course of braking and are reduced to a predetermined value by adjusting the brake pressure for at least the brakes of the trailer vehicle in dependence on the longitudinal inclination of the tractor vehicle and of the actual deceleration thereof. The adjusted value of the brake pressure is retained for the purpose of being the starting value at the next braking of the vehicles.

7 Claims, 1 Drawing Sheet

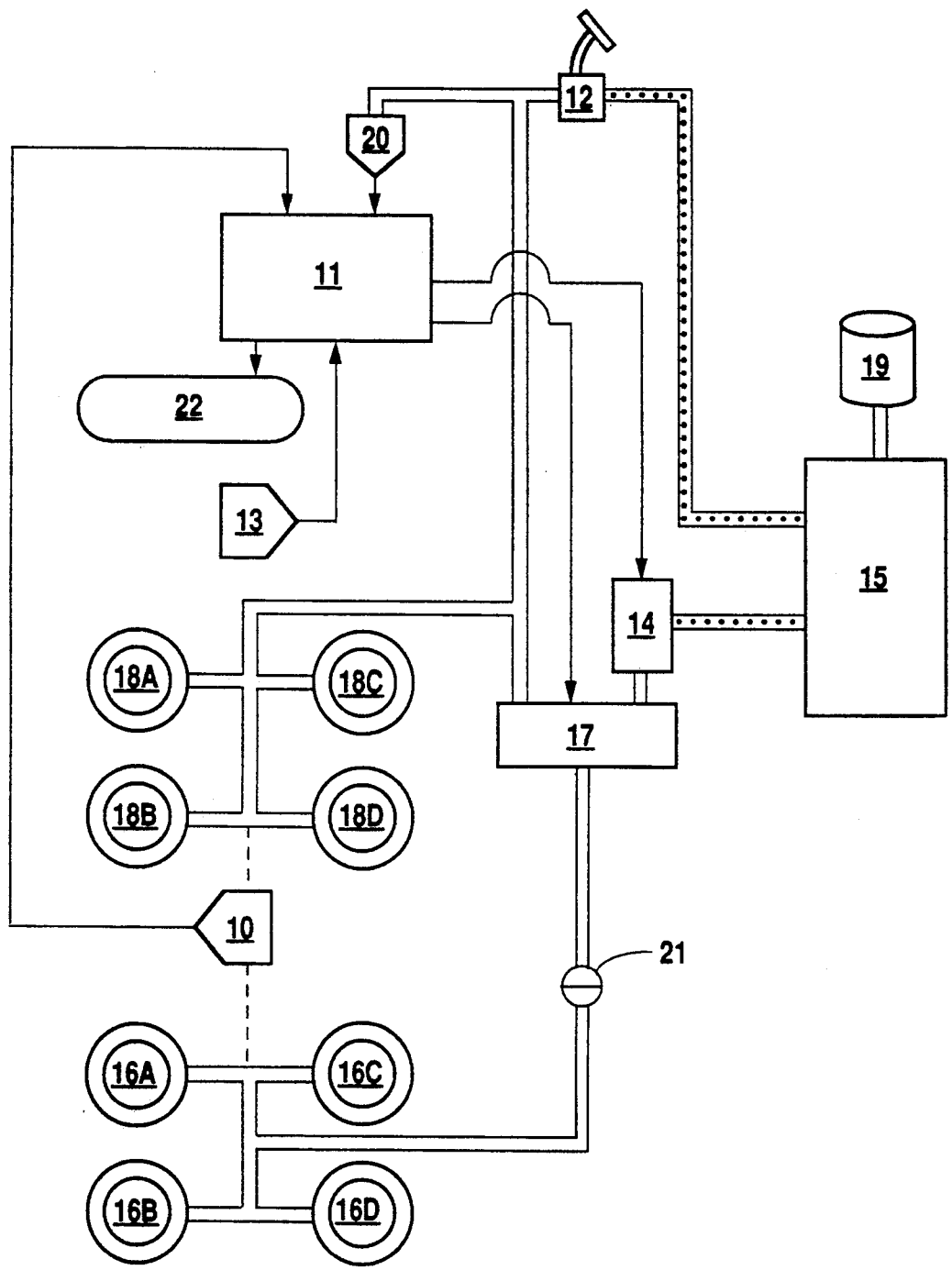

METHOD AND DEVICE IN TRACTOR-TRAILER BRAKES

BACKGROUND OF THE INVENTION

1. Field of the Invention

The invention relates to a method and a device for controlling the operating brake pressure for pressure medium brakes in a vehicle combination comprising a tractor vehicle and at least one trailer vehicle, said vehicles being connected by a conventional coupling device, according to which the driver of said tractor vehicle generates by means of a brake valve an operating pressure defining the brake pressure of said tractor and trailer vehicle, forces developing in said coupling device being measured during the course of braking and being reduced to a predetermined value.

2. Description of the Related Art

The brakes of a trailer vehicle in a vehicle combination are adjusted so as to function in a satisfying way when the trailer vehicle is fully loaded. National laws and regulations stating the lowest deceleration which the vehicle combination has to fulfil when braking must also be complied with. In practice this means that certain problems arise when the trailer vehicle is uncompletely loaded or when it is not loaded at all. The problems arising are for instance wheel locking when braking, brake overheating, unnecessary wearing of the brake lining of the trailer vehicle brakes and on the coupling device between said tractor and trailer vehicle, etc.

To overcome these problems it is suggested in SE 455 854 to provide in the coupling between said tractor and trailer vehicle a transducer for indicating pulling and pushing, respectively, of the coupling and that said transducer is operatively connected through a central unit to a valve for controlling the brake pressure to the brakes of said trailer vehicle. The control of the brake pressure is made through the service brake system of the tractor vehicle and is thus comparatively slow. Furthermore, the control can only take place as a decrease of the pressure existing in the tractor vehicle during the braking An adjustment which in certain aspects is less favourable can also take place when there is a braking on a hill, and in a non-moving vehicle if there is a signal received from the transducer while at the same time the driver presses the brake pedal.

Also other problems may arise in an incorrect distribution of the braking power between the tractor and the trailer vehicle when the vehicle combination is decelerated. In a tractor vehicle having a lower braking power than accepted by law also the braking power of the vehicle combination will be unsatisfactory and below the accepted. If the braking ability of the brakes of the tractor vehicle is too low the result is a pushing trailer vehicle, which may result in so called jack-knifing Said latter problem is suitably avoided by securing that the rear vehicle of the vehicle combination is braked first and that there is a certain amount of overcapacity in the brakes of said vehicle. Such a solution was suggested in U.S. Pat. No. 4,231,442, a device according to said patent comprising a power sensitive transducer arranged in the coupling between said tractor and trailer vehicle, an amplifier, and a switch connected to the brake pedal of said tractor vehicle. When the driver presses said braking pedal the brakes of the trailer vehicle are first activated. The pulling force thereby appearing in said coupling between the vehicles actuates through said amplifier the brakes of the tractor vehicle. The amplifier is activated only if said switch has been actuated by said brake pedal. However, there is a considerable risk in activating firstly the brakes of said trailer vehicle because if said brakes do not work properly the result may be that the vehicle combination as a whole is not decelerated sufficiently neither with respect to the actual braking requirement nor with respect to the minimal deceleration prescribed.

To avoid wearing of the tires and to decrease the risk of skidding there has also been suggested different systems comprising non-locking brakes. However, such systems do not overcome problems with an unnecessary wearing of the brake linings of the trailer vehicle brakes and on the coupling device between said tractor and trailer vehicle. Also, it is not possible to avoid problems with increasing differences in temperature between the different wheel brakes of the vehicle units. If the vehicles are provided with pressure brakes there is also a certain unnecessary waste of pressurized air during every course of braking because any excess pressure is ventilated so as to avoid wheel locking. However, non-locking brakes can be an excellent supplement to other types of brake control systems.

SUMMARY OF THE INVENTION

An object of the present invention is to overcome generally the problems and drawbacks mentioned above of previously known brake control systems. Another object of the invention is to secure a high total braking ability of the vehicle combination, to provide the required and prescribed deceleration even if any of the vehicles during operation has a problem with reduced braking ability.

DETAILED DESCRIPTION OF THE PREFERRED EMBODIMENT

Now the invention will be described in more detail by means of an embodiment, reference being made to the accompanying drawing, which is a schematic drawing of the device according to the invention In the coupling between the tractor and the trailer vehicle there is provided a force sensitive transducer 10, delivering an electric signal in dependence of the force acting on said coupling. The electric signal is fed to a central unit 11 controlling in dependence of said signal and other incoming electric signals the brake pressure of the air pressure brakes 16A-16D of the trailer vehicle. By means of a brake pedal, which is provided with a valve 12, said pedal being arranged in the tractor vehicle, the driver of the tractor vehicle controls the brakes 18A-18D of the tractor vehicle. Between the valve 12 and the brakes there is in a conventional way provided brake valves, said valves not being shown on the drawing for a reason of clarification of the invention.

The primary side of said valve 12 is connected to a supply container 15, and the secondary side thereof is connected to a pressure sensitive transducer 20 recording the so called operating pressure, and converting the pressure signal to an electric signal, which is supplied to the central unit 11. In the tractor vehicle there is provided also an accelerometer 13 recording the longitudinal inclination in relation to the horizontal plane of the tractor vehicle and also the acceleration and deceleration, respectively, of the vehicle. The accelerometer can be of a conventional type that converts recorded signals to electric signals, which are supplied to the central unit 11.

An electrically controlled valve 14 is on the primary side thereof connected to the supply container 15, and is operatively connected to said central unit 11, and receives from said central unit 11 an electric control signal. In dependence of said control signal the pressure supplied from said supply container 15 is adjusted to the desired operating pressure, which is supplied to the brakes 16A–16D of the trailer vehicle through conventional coupling means between said vehicles In accordance with the brakes of the tractor vehicle the operating pressure is utilized to actuate the brakes through conventional brake valves, not shown here. A compressor 19 maintains the desired supply pressure in said container 15.

For security reasons a two-way valve 17 is provided between the valve 14 and the brakes 16A–16D of the tractor vehicle. The second input of said two-way valve 17 is supplied with operating pressure from said valve 12 of the brake. An error condition with any of the more important components of the device said two-way valve 17 is activated in such a way that the brakes of the trailer vehicle are supplied with the operating pressure of the tractor value by said valve 14. This by-pass can be accomplished also by means of an electric switch provided at the driver's seat.

The operating pressure line from the two-way valve 17 provided on the tractor vehicle is connected to operating pressure lines on the trailer vehicle through conventional connection means 21 between the vehicles.

At the driver's seat there is provided a display 22, which is operatively connected to said central unit 11, and which receives signal from said unit 11 about the present control condition and direction of forces in said coupling device between the tractor and the trailer vehicle so as to inform the driver. Any error conditions in the brakes or other relevant parts are stored in the central unit and can be read by means of indicating means that can be connected to said central unit.

Now a braking course on flat ground, that is, when the accelerometer at the start of the braking does not indicate any inclination, acceleration or deceleration, will be described.

During driving forces in the coupling are continuously recorded by the force sensitive transducer 10, the actual state of forces being the basis of the control. When the driver presses the brake pedal said valve 12 adjusts in relation to the pressing of the pedal the actual supply pressure to an operating pressure, which is supplied to the pressure sensitive transducer 20 and also to said two-way valve 17. The control pressure is supplied also directly to the brakes 18A–18D of the tractor vehicle. An increase of the operating pressure over a predetermined value is recorded by the central unit 11, which by a short impulse opens completely said valve 14 thereby affecting the brakes of the vehicle to initiate movement towards a brake position. At the same level of the operating pressure the output of said accelerometer is also recorded. If said output indicates that the longitudinal axis of said tractor vehicle is not parallel with the horizontal plane, that is the vehicle is in a hill, or if said accelerometer indicates that the vehicle is standing still no control of the brake pressure to the brakes of the trailer vehicle takes place. A previously made adjustment of the brake pressure to the brakes of the trailer vehicle instead remains during these circumstances. However, if the tractor vehicle is in a horizontal position a new control procedure as described below is initiated. If a previously made adjustment of the brake pressure exists said adjustment is utilized as a initial value and a corresponding pressure is supplied to the brakes through said valve 14 and said two-way valve 17.

The force now acting on the coupling between the tractor and the trailer vehicle is continuously recorded by the pressure sensitive transducer 10. A pulling force indicating a brake power of the tractor vehicle which is too large is recorded by the central unit, which decreases the operating pressure through the valve 14. However, the decrease takes place only when the vehicle combination is decelerated appropriately. The deceleration is continuously recorded by said accelerometer 13, the output thereof being processed by said central unit during the control and brake procedure. When the power acting on the coupling has been decreased to a predetermined value the control procedure is interrupted and the present value is stored in the central unit. Said value is later used as an initial value at the next brake procedure.

When pushing is indicated, that is when the brake power of the trailer vehicle is too low, said central unit transmits a signal to said valve 14 to increase the operating pressure to the brakes of the trailer vehicle. As said valve 14 is supplied with supplied pressure the operating pressure to the brakes of the trailer vehicle can, if required, exceed the operating pressure to the brakes of the tractor vehicle. This is a considerable advantage because normally there are pressure losses in operating pressure lines of the tractor vehicle, said losses decreasing the available pressure interval.

To achieve the prescribed deceleration higher pulling forces are allowed in the coupling even though the wear thereof is increased However, such a control condition depends on a malfunction of the brakes of the tractor vehicle, and such a condition is stored in the central unit as described above.

In respect of the present control condition of the brake pressure there is a reset of the central unit each time the driver brakes the vehicle with the parking brake. Thus, the next braking procedure is started with a non-adjusted operating pressure, that is the same control pressure to the brakes of the trailer vehicle as to the brakes of the tractor vehicle.

The by-passing of said valve 14 resulting in that the operating pressure of the tractor vehicle instead is supplied to the brakes through said two-way valve 17 and may be made manually by an electric switch not shown here. The driver has this opportunity of by-passing so as to ensure that the maximum brake pressure always can be provided to the brake of the trailer vehicle.

Zero adjustment of the force sensitive transducer and the accelerometer is made after mounting the device in the vehicle by pushing a push-button switch, the present value of the signals from said transduser and accelerometer then being stored in the central unit 11 as zero value. The zero adjustment of said transduser is then made automatically and continuously.

I claim:

1. A method for controlling an operating brake pressure to pressure medium brakes arranged in a vehicle combination, said vehicle combination comprising a tractor vehicle with a driver and at least one trailer vehicle, said vehicles being connected by a conventional coupling device, and wherein said driver of said tractor vehicle generates by a brake valve, an operating pressure determining said operating brake pressure for said tractor and trailer vehicles, and wherein forces arising in said coupling device measured by a force sensitive transducer during braking and are reduced by an electrically controlled valve to a predetermined force valve, comprising the steps of:

measuring said operating pressure with a pressure sensitive transducer and converting it into an electric signal;

recording with an accelerometer any longitudinal inclination of said tractor vehicle and any acceleration and deceleration, respectively, of said vehicle combination;

controlling said operating brake pressure when said operating pressure measured exceeds a predetermined pressure value, said recorded longitudinal inclination is below a predetermined inclination value, and said deceleration exceeds a predetermined deceleration value, said controlling of said operating brake pressure being achieved by opening and closing said electrically controlled valve, thereby adjusting said electric signal to decrease said forces, and by storing in a central unit an adjustment setting of said controlled pressure so as to be an initial adjustment setting at a subsequent braking.

2. The method according to claim 1, characterized in that a value of said forces during normal driving conditions in said coupling are measured in said force sensitive transducer, and that said measured value of said forces is utilized as a preference value at continuous zero adjustments of said force sensitive transducer.

3. The method according to claim 2, characterized by initiating all braking procedures by opening completely said brake valve during a short impulse.

4. The method according to claim 1, characterized by initiating all braking procedures by opening completely said brake valve during a short impulse.

5. The method according to claim 4, characterized by inhibiting said adjustment setting of said operating brake pressure when a parking brake of said tractor vehicle is activated.

6. A device for controlling an operating brake pressure to pressure medium brakes arranged in a vehicle combination, said vehicle combination comprising a tractor vehicle and at least one trailer vehicle, said vehicles being connected by a conventional coupling, comprising;

a force sensitive transducer mounted in said coupling to measure forces arising in said coupling;

a central unit (11) operatively connected to said transducer;

a brake pedal valve (12), a primary side thereof being connected to a supply container (15), and a secondary side thereof being connected to brakes (18A-18D) of said tractor vehicle;

an electrically controlled valve (14) having a primary side and a secondary side;

converting means (20) connected to said secondary side of said brake pedal valve (12) to record an operating pressure and to convert said pressure to an electric signal; and means (13) provided to record any longitudinal inclination of said tractor vehicle and acceleration and deceleration, respectively, of said vehicle combination;

wherein said primary side of said electrically controlled valve (14) is connected to said supply container (15), said secondary side of said electrically controlled valve (14) being connected to said brakes (16A-16D) of said trailer vehicle, and wherein said central unit is operatively connected to said electrically controlled valve (14) and is constructed to start a control procedure when said operating pressure exceeds a predetermined pressure value, when said longitudinal inclination recorded is below a predetermined inclination value, and when said deceleration exceeds a predetermined deceleration value, and wherein said central unit (11) is arranged to store an adjustment setting of said operating pressure, said setting being utilized as an initial setting at a subsequent braking.

7. The device according to claim 5, wherein said central unit is operatively connected to a control means for a parking brake of said tractor vehicle and is arranged to reset said adjustment setting to a non-controlled value when said parking brake is activated.

* * * * *